United States Patent Office 3,574,636
Patented Apr. 13, 1971

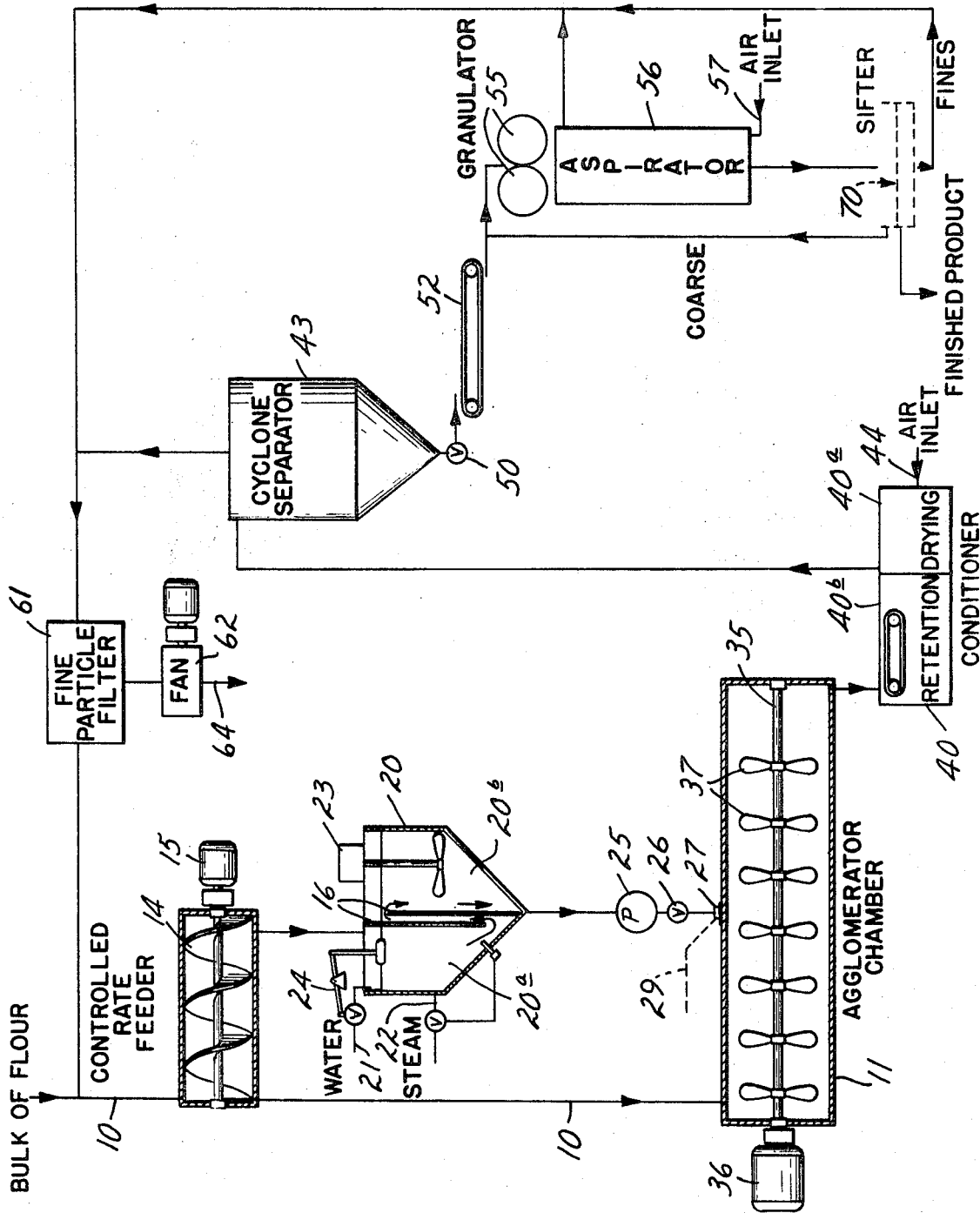

3,574,636
PRODUCT AND METHOD OF AGGLOMERATING FLOUR
Tibor A. Rozsa, Winona, Minn., assignor to Bay State Milling Company, Winona, Minn.
Filed May 5, 1967, Ser. No. 636,448
Int. Cl. A21d 2/36
U.S. Cl. 99—93                                      16 Claims

ABSTRACT OF THE DISCLOSURE

A method of forming starchy flour into agglomerates wherein a relatively small proportion of the flour is segregated from the main body thereof and cooked in a relatively large quantity of water to at least partially gelatinize the starch in the flour, denature and disperse the protein, and form a low viscosity slurry. The thin binder is then atomized or otherwise dispersed into small droplets which are intimately mixed and contacted with the particles in the main body of the flour to cement them into agglomerates. These agglomerates are subsequently dried to safe storage moisture levels. The agglomerates are thereafter conveyed through a separating stage to remove unagglomerated particles therefrom, another process step to reduce oversized particles to a specified size, and a recycling stage which returns undersized particles to the inlet of the whole process, still oversized particles to the head of the reduction stage, and conveys agglomerates of the desired size to a finished product outlet.

BACKGROUND OF THE INVENTION

Field of the invention

In many industries utilizing flours and specifically starchy flours, the finely ground flours are inconvenient because they are not free flowing and will not disperse in liquids readily. Also, a fine film of dust is stirred throughout the plant by the handling thereof. This dust causes sanitation problems, and may produce a fire hazard also. A method of handling the flour which is particularly desirable is to form the flour into small pellets or agglomerates. These agglomerates will spontaneously disband in water to their original particle size and into a uniform suspension without intense agitation.

Description of the prior art

In the prior art, many types of apparatus and methods are utilized to pelletize and/or agglomerate flour. The most common of these various methods is the use of steam and/or atomized plain water which is sprayed into a chamber in which finely ground flour is suspended in air and vigorously agitated. Particles of the flour adhere to each other, because moisture makes them sticky and form the agglomerates which are subsequently dried. In this method, the protein matter of the flour acts as a binder, after it is actuated by the moisture, and has a tendency to hold the flour particles together even after the agglomerate is dried. However, in most instances, such agglomerates are weak, brittle and easily crumble back into the original finely ground state. This is especially true if the flour is of a low protein type.

In some methods of agglomerating flour into harder pellets, additives, such as water-miscible alcohols (ethyl and isopropyl alcohol) and other organic solvents (hexane and/or acetone), or naturally sticky materials such as molasses solution, gums, gluten, dextrose, sucrose, and lactose, are utilized as a binder. These additives are added in large quantities to the bulk of flour and, in general, do not modify the flour but, because of their sticky character simply cause the particles of flour to stick together. In many instances, these additives will produce undesirable side effects, such as changes in taste, enzyme susceptibilty, hydration quality, etc., and in all cases these additives make the final product more expensive. Flours agglomerated by utilizing these additives might be acceptable in certain applications, while they would be unacceptable in others. Therefore, no universally acceptable flour can be produced by utilizing any of these additives.

SUMMARY OF THE INVENTION

The present invention pertains to a new and improved method of agglomerating flours and the product produced thereby, and more particularly to a method in which a relatively small portion of flour is utilized to form a thin slurry of adhesive binder by modifying it with a relatively large quantity of water and, in some instances, small quantities of special chemicals until it is at least partially gelatinized. This binder is later dispersed into a plurality of droplets in a chamber which is tumbled or in which a relatively large quantity of flour particles are suspended and agitated in air, and the resulting collisions form agglomerates which are subsequently conditioned to form a hard, cemented and coated finished product.

It is an object of the present invention to provide a new and improved method of agglomerating flour and the product produced thereby.

It is a further object of the present invention to provide a new and improved agglomerating method in which a small portion of the flour is modified and utilized as a binder.

It is a further object of the present invention to provide a new and improved method of agglomerating low protein cereal flours.

It is a further object of this invention to make harder pellets than it is possible to agglomerate with the use of water, steam or mixtures thereof.

It is a further object of this invention to provide pellets having a coating with controlled thickness and hardness.

It is a further object of the present invention to provide an agglomerated flour which is inexpensive and commercially acceptable in general.

These and other objects of this invention will become apparent to those skilled in the art upon consideration of the accompanying specification, claims, and drawings.

BRIEF DESCRIPTION OF THE DRAWINGS

Referring to the drawing the single figure illustrates, schematically, apparatus for performing the novel method of agglomerating flour.

DESCRIPTION OF THE PREFERRED EMBODIMENT

In the figure, the numeral 10 designates a duct through which the main body of flour moves to the inlet of a chamber 11. Although the flour moving through duct 10 can be any starchy flour, in general the flour will be a cereal flour (the term cereal flour includes all flours produced from cereal grains regardless of the optional and/or additional treatment thereof such as bleaching, maturing, air separating, etc.) and in this preferred embodiment a low protein cereal flour is utilized. For purposes of this specification, the term "low protein" is defined as having 10% or less protein (N×5.7) in the flour. Also, the preferred cereals are wheat, rye and barley, since large quantities of these cereals are grown so that with proper gain selection flour produced by known milling methods has a low protein content.

The duct 10 has a controlled rate feeder, such as screw type conveyor 14 or the like, attached thereto, which conveyor 14 is powered by a variable speed motor 15, to remove a predetermined but variable amount of flour from the duct 10. In some instances it may be desirable to use flour which differs somewhat from the bulk flour moving in duct 10. In these instances and where more convenient, a separate supply of flour may be proportioned by the conveyor 14, or some other controlled rate feeder. This small portion of flour is then discharged out of the screw type conveyor 14 into a vessel 20. In general, the amount of flour leaving the conveyor 14 will be approximately 5% or less of the amount of flour delivered in the duct 10, and in a gravity flow embodiment, the amount of flour is approximately 1% of the flour moving in the duct 10 if the flour is rye flour, approximately 1½% if it is wheat flour, and approximately 2% if it is barley flour. If the system is a pressure or pumping embodiment as illustrated, rather than a gravity flow embodiment, these ratios can probably be increased to approximately 4 or 5%. Greater proportions of flour in the slurry increase the hardness of the final agglomerate since a thicker coating is produced thereon, as will be apparent presently. Hardness is defined as resistance to mechanical forces and solubility.

The vessel 20 is separated into a flour receiving or modifying portion 20a and a storage portion 20b by a pair of baffle plates 16, one of which depends downwardly from the top of the vessel 20 and one of which extends upwardly and parallel to the first from the bottom of the vessel 20. The baffle plates 16 are situated so that fluid material may pass from the bottom of the modifying portion 20a upwardly to overflow one of the baffle plates 16 into the storage portion 20b. The modifying portion 20a of the vessel 20 also has connected thereto a water supply 21 which may include various chemicals in solution, well known to those skilled in the art. The mixture of flour and water is heated in this embodiment by means of a thermostatically controlled steam jet 22. The slurry formed in the modifying portion 20a by the mixture of flour and water overflows the baffle plates 16 into the storage portion 20b where it is agitated to maintain the flour suspended in the water by means of a mixer 23. It should be understood that the illustrated means of heating and mixing the slurry are only one method and apparatus for performing these functions, chosen for simplicity and ease of explanation, and many other methods and apparatus can be provided by those skilled in the art, all of which come within the scope of this invention.

In the present embodiment, the amount of water mixed with the flour in the vessel 20 is sufficient to raise the moisture content of the agglomerated flour to approximately 25%, prior to drying of the agglomerates. Because of the relatively large quantity of water mixed with the flour in the vessel 20 and because of the elevated temperatures therein, the slurry in the vessel 20 has a low viscosity or is very thin. The flour is cooked in the vessel 20 sufficiently to at least partially gelatinize the starch therein, and preferably, will fully gelatinize all of the starch in the flour. Also, by aggressively cooking, hydrating and agitating the flour in the vessel 20 and in atomizing nozzle 27, many of the particles of gelatinized starch will be reduced to several smaller particles through the turbulence and mechanical shear forces applied thereto. These smaller particles of starch matter provide a more effective binder for the agglomerated product. The mechanically, physically modified starch slurry has low specific viscosity; it has good and approximately instant film-forming properties. Also, the film formed by the slurry is smooth and flexible and similar to that at chemically modified (oxidized) starches. In addition to gelatinizing the starch and producing smaller starch particles, the cooking of the flour volatilizes and neutralizes some of the lipids, coagulates some of the protein (making it nonsoluble) disperses some of the protein to small particle size fragments, and inactivates many of the enzymes.

It should be understood that the flour-water slurry in the portion 20a of the vessel 20 can be modified chemically in addition to cooking. It is well known in the art that the chemicals or adjuvants can be added to help or increase the modification of the flour. Examples of chemicals which may be utilized are: sodium hydroxide, which lowers the gelatinization temperature of flour; preservatives, such as sulfur compounds some of which are sodium bisulfite, sodium sulfite, sodium metabisulfite, sodium thiosulfate, sulfuric acid, etc., which preservatives render proteins of flour soluble; and sequestrants, some of which are sodium tripolyphosphate, sodium trimetaphosphate, sodium hexametaphosphate, etc., and/or acetic anhydride, sodium acetate, etc., which contribute to the cross linking of organic polymers to increase the hardness of the finished product.

The slurry is conveyed from the portion 20b of the vessel 20 to a pump 25, the outlet of which is connected to an atomizing nozzle 27. In some embodiments, it may be desired to facilitate the atomizing of the slurry by means of a compressed air stream. For example, through much experimentation it has been found that greater proportions of flour in the slurry of the vessel 20 increases the hardness of the agglomerates produced. However, as the proportion of flour increases, the slurry becomes thicker and the upper limit of the amount of flour used in the vessel 20 depends upon the type of equipment used to form the agglomerates. For this purpose, an optional compressed air or steam line 29, illustrated in dotted lines in the figure, is connected to the atomizing nozzle 27, to illustrate an embodiment which is especially useful where the slurry is somewhat thicker. Although specific experiments were not performed, slurrys containing up to 5% of the main body of the flour might be utilized where high pressure compressed air is introduced into the atomizing nozzle also.

In the operation of the vessel 20 and its associated auxiliaries, the pump 25 contains or is associated with an adjustable valve 26 which delivers an adjustable proportion of slurry to the atomizing nozzle 27 approximately equal to 5 to 15% by weight of the flour moving in the duct 10. Greater proportions of slurry delivered to the chamber 11 increase the coating thickness of the agglomerates and the hardness thereof. The thickness of the coating is increased because initial droplets of slurry bind particles of flour together to form agglomerates while additional droplets colliding with the agglomerates form a coating therearound. Increasing the proportion of slurry increases the number of droplets available to form the coating, thereby, increasing the thickness of the coating. When the proportion of slurry is increased the moisture level is raised, which in combination with some retention time, reacts to retrograde the starch and form harder surfaces.

As the slurry flows from the vessel 20, a float and valve arrangement 24, associated with the water source 21, serves to maintain the level of the slurry in the vessel 20 approximately constant. The variable speed motor 15 associated with the conveyor 14 provides a regulated and constant flow of flour into the vessel 20 so that the slurry in the vessel 20 is constant consistency, or ratio of flour to water. It will be obvious to those skilled in the art that many sophisticated instruments and control systems can be incorporated to insure a dependable flow of a uniform slurry, but the present embodiment has been illustrated for simplicity of explanation and it is intended that the more sophisticated control apparatus come within the scope of this invention.

An agglomerating chamber 11 has a plurality of beater arms 37 rotatably mounted therein on a shaft 35 powered by a motor 36. The outlet end of the duct 10 is attached to the chamber 11 so that the flour moving in the duct 10 passes into the chamber 11. The arms 37 constantly agitate the flour particles and air within the chamber 11, and suspend the flour particles in the air within the chamber 11. The atomizing nozzle 27 is mounted on the chamber 11 and disperses droplets of slurry into the turbulence created by the beater arms so that the droplets are carried to all parts of the chamber 11 where they collide with flour particles to form agglomerates. As the arms 37 increase in speed the turbulence increases, whereby, the speed of agglomeration of the slurry and particles increase. However, the speed of the arms 37 will limit the size of the agglomerates formed by breaking up over sized agglomerates.

The agglomerates of flour are propelled by the arms 37 toward an outlet of the chamber 11 where they are dispatched to a conditioner 40. The agglomerates entering the conditioner 40 contain approximately 25 to 30% moisture and the conditioner 40, which may contain single and/or a plurality of drying stages 40a and/or retention staies 40b, removes at least 50% of the moisture so that agglomerates leaving the conditioner 40 contain less than 15% moisture and generally in the range of 9 to 12% moisture. The agglomerates are then separated from any finer particles in a cyclone separator 43 which causes the very fine particles to be moved to a fine particle filter 61, and the agglomerates to be moved to a restricting valve 50. The restricting valve 50 provides a constant flow of agglomerates to a belt conveyor 52, or equivalents, which is included to provide a retention time for the agglomerates, to allow moisture remaining therein to diffuse throughout the agglomerates and/or cooling thereof, if desirable.

The agglomerates leaving the belt conveyor 52, or the restricting valve 50 if the belt conveyor 52 is not utilized, are conveyed into a granulator or a roller mill 55 where oversized agglomerates are crumbled to the desired size, which depends upon the end use thereof. The agglomerates are conveyed from the roller mill 55 to an aspirator type of separating apparatus designated 56. The aspirator separates the agglomerates from fine or unagglomerated particles, cools and conveys them into an optional sifting apparatus designated 70. The finer particles are carried to the fine particle filter 61. Agglomerates of approximately the desired size pass through an upper sieve and over a lower sieve in sifter 70 and appear at the outlet thereof as a finished product. Agglomerates larger than the desired size are conveyed over the upper sieve of the sifter 70 back to the input of the roller mill 55. Fine particles, which pass through both the upper and lower sieve of the sifter 70 are conveyed to the fine particle filter 61. Both the contitioner 40 and the aspirator 56 have air inlets designated 44 and 57, respectively, which allow air to enter the system. The fine particle filter 61 has a fan and motor 62 attached thereto which draws the air and the fine particles through the system into the fine particle filter 61 where the fine particles are removed from the air and conveyed to the duct 10 while the clean air is vented back to the atmosphere at an air outlet 64.

It should be understood that the various steps and apparatus set forth in the foregoing description constitute one embodiment for providing a finished product. Since the various qualities of the finished product will differ, depending upon the end use for which they are produced, and since many different machines can be utilized in a great variety of steps and combinations, it is fully intended that all such modifications come within the scope of this invention.

Following are examples of agglomerated cereal flours produced by the new process set forth.

EXAMPLE 1

100 pounds of low protein rye flour is conducted through the duct 10. One pound of the rye flour is removed from the duct 10 by the conveyor 14, while 99 pounds continue through the duct 10 on to the chamber 11. The rye flour is a commercial refined flour with 11% moisture content. Approximately 23 pounds of water are addedd to the one pound of rye flour in the vessel 20 and the mixture is thoroughly cooked at a temperature of 90° C. The 24 pounds of slurry formed in the vessel 20 are then mixed with the 99 pounds of flour in the chamber 11 to form agglomerates, which upon passing through the drier 40 contain approximately 11% moisture. The agglomerates are then processed in the remaining apparatus as previously described.

EXAMPLE 2

100 pounds of wheat flour are delivered through the duct 10. 1½ pounds of wheat flour are removed from the duct 10 and introduced into the vessel 20. The remaining 98½ pounds of wheat flour continue to the chamber 11. The wheat flour is a commercial refined flour having 13% moisture content. Approximately 20 pounds of water are added to the 1½ pounds of wheat flour in the vessel 20, and the mixture is thoroughly cooked at a temperature of 90° C. The 21½ pounds of slurry are conveyed to the chamber 11 by gravity and dispersed with the 98½ pounds of flour to provide 120 pounds of agglomerates at the output. The agglomerates are processed in the drier 40 and contain approximately 11% moisture content upon the discharge therefrom. The agglomerates are then processed in the remainder of the apparatus as described above.

EXAMPLE 3

100 pounds of barley flour is moved into the duct 10 and 2 pounds are removed by the conveyor 14. The remaining 98 pounds of barley flour are moved through the duct 10 to the chamber 11. The barley flour is a heat treated flour having approximately 5% moisture content. Approximately 31 pounds of water are added to the 2 pounds of barley flour in the vessel 20, and thoroughly cooked at a temperature 90° C. The 33 pounds of slurry are mixed with the 98 pounds of barley flour in the chamber 11 to form agglomerates which are delivered to the drier 40. The agglomerates leaving the drier 40 have approximately 10% moisture content therein. These agglomerates are then processed in the remainder of the apparatus as described previously.

Thus, a new of agglomerating starchy flours and a product produced thereby has been described. This method and product is highly acceptable, since no outside additives are required, and since flour containing any percentages of protein can be agglomerated. Further, the slurry holds the agglomerates in relatively hard pellets which do not crumble or break apart during handling. The hardness of the pellets can be controlled by controlling the portion of flour in the slurry and the proportion of slurry to flow.

While I have shown and described specific embodiments of this invention, further modifications and improvements will occur to those skilled in the art. I desire it to be understood, therefore, that this invention is not limited to the particular form shown, and I intend in the appended claims to cover all modifications which do not depart from the spirit and scope of this invention.

What is claimed is:

1. In the process of agglomerating flour wherein the flour is contacted with moisture or other binders and the flour is thereafter agglomerated, the improvement which comprises using as said binder a thin slurry of water and starch, the latter having been at least partially gelatinized.

2. The improved process of claim 1 wherein said binder is formed by cooking a thin slurry of flour and water to at least partially gelatinize the starch present in such flour.

3. The improved process of claim 1 wherein adjuvants are added to the slurry to aid in altering the size of the starch molecules.

4. The improved process of claim 2 wherein the flour to be agglomerated is rye flour.

5. The improved process of claim 4 wherein the flour used to form the binder is rye flour.

6. The improved process of claim 2 wherein the flour to be agglomerated contains less than 10% protein.

7. The improved process of claim 1 wherein the agglomerates formed by the process are conditioned by retaining the agglomerates in the moistened condition for a period of time.

8. The improved process of claim 7 wherein the agglomerates formed by the process are further conditioned by drying the agglomerates to a moisture content of less than 15%.

9. The process of agglomerating flour which comprises:
(a) forming a binder by cooking a thin slurry of flour to at least partially gelatinize the starch contained in said flour;
(b) contacting flour which is to be agglomerated with said binder under agglomerating conditions, thereby agglomerating said flour; and
(c) collecting and drying agglomerated flour.

10. The process of claim 9 including the step of providing varying proportions of binder and flour to be agglomerated to produce agglomerates with variable characteristics.

11. The process of claim 9 wherein the flour used in step "a" to form the binder is less than 5% of the total flour used in steps "a" and "b."

12. The process of claim 11 wherein the type of flour used in step "a" and the type of flour used in step "b" are similar.

13. The process of claim 9 wherein the drying of step "c" is continued until the moisture content of the agglomerated flour is less than 15% and a sufficient retention time is provided during drying to allow moisture within the agglomerates to diffuse throughout the agglomerates.

14. Agglomerated flour comprising particles of low protein flour bound together wtih a binder which comprises flour that has been substantially gelatinized and which flour constitutes less than 5% of the agglomerated flour.

15. Agglomerated flour as set forth in claim 14 wherein the particles of flour include rye flour.

16. Agglomerated flour as set forth in claim 14 containing in addition a bisulfite compound.

References Cited

UNITED STATES PATENTS

| | | | |
|---|---|---|---|
| 1,035,830 | 8/1912 | Anderson | 99—Agglom. Dig. |
| 2,441,409 | 5/1948 | Green | 99—11 |
| 2,900,256 | 8/1959 | Scott | 99—56 |
| 3,057,727 | 10/1962 | Shields | 99—56 |
| 3,248,228 | 4/1966 | Gidlow et al. | 99—93 |
| 1,392,221 | 9/1917 | Rodman | 23—313X |

OTHER REFERENCES

Leach, H. W.: "Gelatinization of Starch," Starch Chemistry and Technology, vol. I, Academic Press, New York and London, 1965, pp. 291–294, 300–303.

LIONEL M. SHAPIRO, Primary Examiner